Inventor
E. Kern

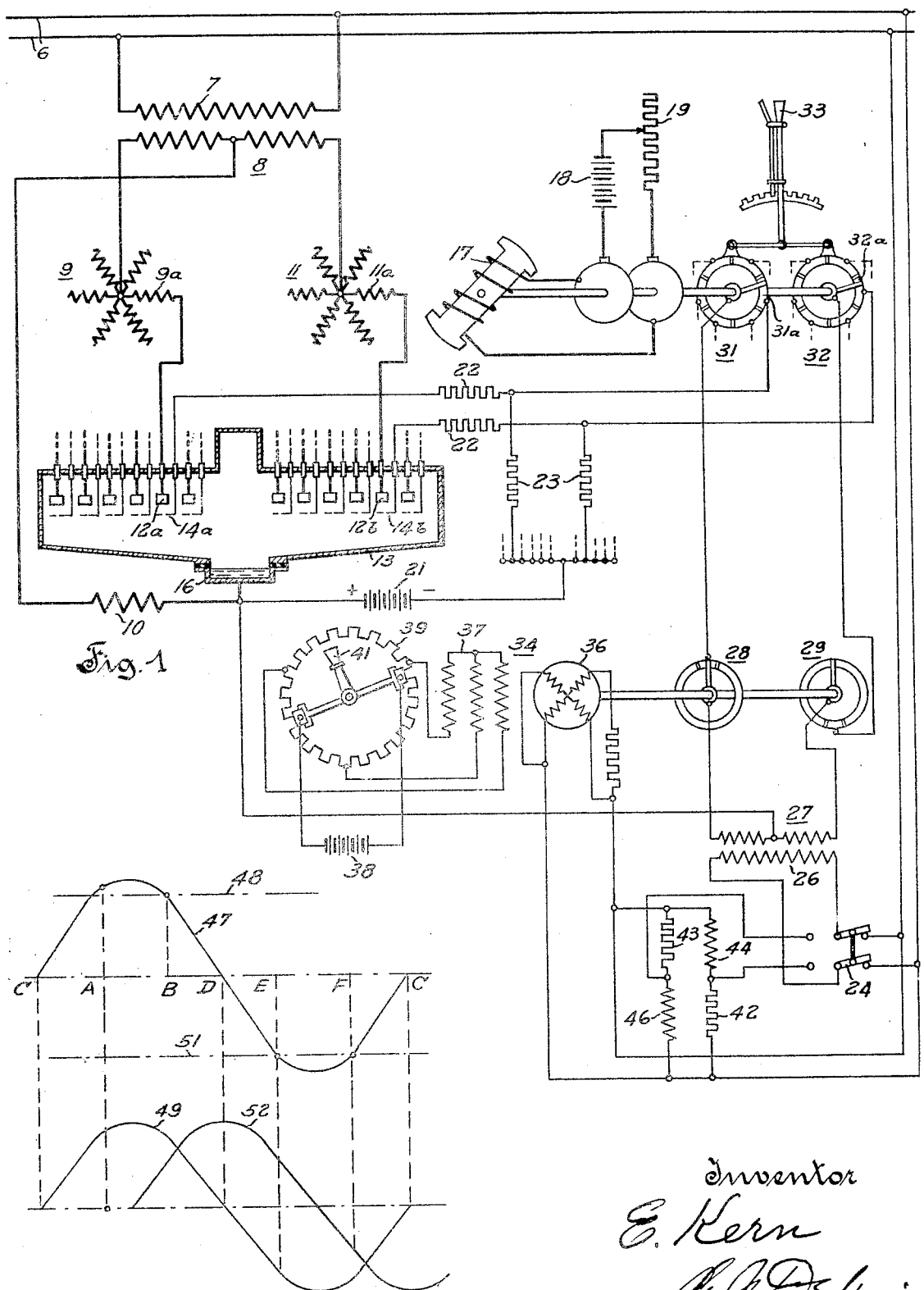

Patented Jan. 1, 1935

1,986,207

UNITED STATES PATENT OFFICE 1,986,207

MOTOR CONTROL SYSTEM

Erwin Kern, Ennetbaden, Switzerland, assignor to Aktiengesellschaft Brown Boveri & Cie., Baden, Switzerland, a joint-stock company of Switzerland Application October 19, 1932, Serial No. 638,508 In Germany October 23, 1931

13 Claims. (Cl. 172—274)

This invention relates to improvements in electric motor control systems and more particularly to the control of variable speed alternating current motors in which the armature currents are commutated by means of an electron discharge device.

It is well known that an electric motor of the so called synchronous type may be operated at continuously variable speeds by effecting the commutation of the armature currents thereof by means of a suitable electron discharge device provided with control electrodes. Such control electrodes are then energized from suitable sources through a distributor driven from the motor shaft. By further controlling the energization of the control electrodes through another distributor operating at the frequency of the supply line voltage and by inserting suitable phase shifting means in the control circuits, such motor may be made operable for returning energy to the supply line, thus providing for regenerative braking of the motor. The motor may then also be started, reversed and regulated without using switching devices and without dissipating electrical energy.

It is therefore among the objects of the present invention to provide a control system for variable speed alternating current motors in which the motor armature currents are controlled by means of an electron discharge device or by means of a plurality of such devices.

Another object of the present invention is to provide a control system for variable speed alternating current motors to cause such motors to return energy to the supply line to produce regenerative braking of the motors.

Another object of the present invention is to provide a control system for variable speed alternating current motors whereby such motors may be brought to operating speed without the use of switching devices.

Another object of the present invention is to provide a control system for variable speed alternating current motors whereby the direction of the rotation of such motors may be reversed without the use of switching devices.

Figure 3:
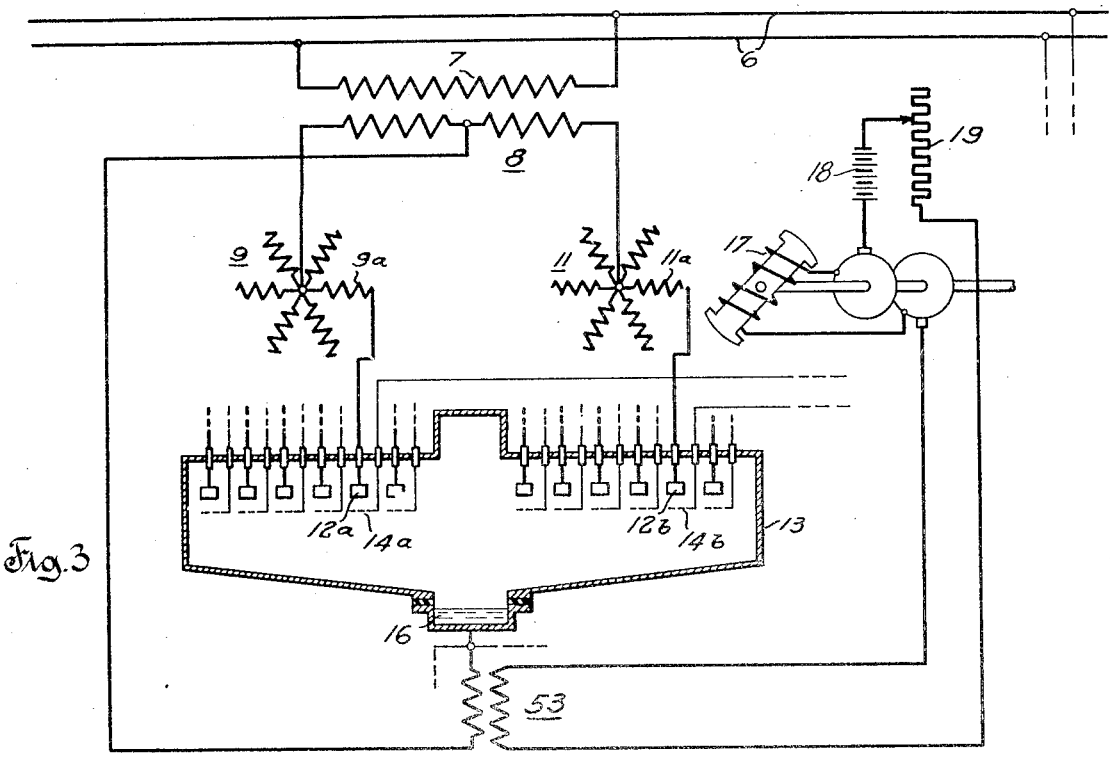
Figure 4:
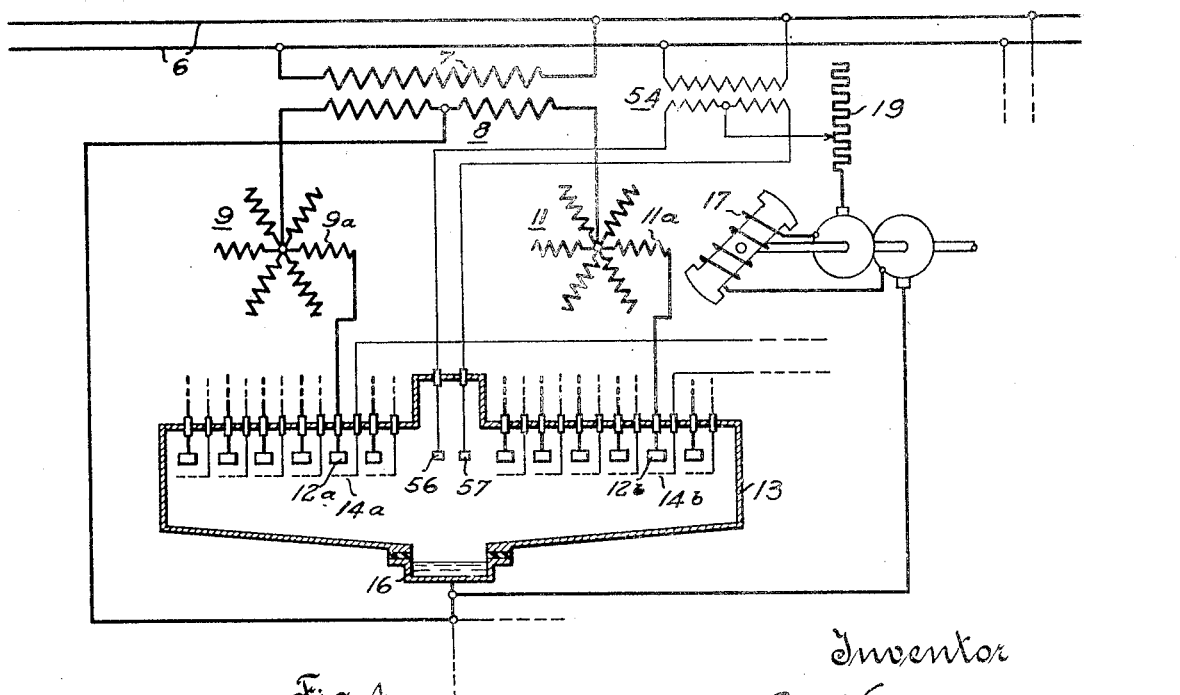

Objects and advantages, other than those above set forth, will be apparent from the following description when read in connection with the accompanying drawings in which:

Fig. 1 diagrammatically illustrates one embodiment of the present invention applied to the control of a single phase motor operable for returning variable amounts of energy to a supply line connected therewith;

Fig. 2 is a diagram of some of the voltages involved in the operation of the motor illustrated in Fig. 2;

Fig. 3 partially illustrates a modified embodiment of the present invention differing from the embodiment of Fig. 1 in that the motor field and armature circuits are coupled by means of a transformer; and Fig. 4 partially illustrates a further modified embodiment of the present invention differing from the embodiment of Fig. 1 in that the motor field is energized from the supply line through the excitation anodes of the electron discharge device.

Referring more particularly to the drawings by characters of reference, the reference numeral 6 designates an alternating current supply line herein illustrated as a single phase line. Line 6 energizes the primary winding 7 of a transformer having a secondary winding 8 which is divided into two equal portions severally connected with the neutral points of the two star connected armature windings 9 and 11 of the motor. The portions of windings 9 and 11 are severally connected with the anodes 12, 12b, etc. of an electron discharge device 13 operable as an electric current rectifier. Rectifier 13 is provided with control electrodes 14a, 14b, etc. and with a cathode 16 which may be connected with the middle point of transformer secondary winding 8 either directly, or as shown in Fig. 1, through a reactor 10. It is assumed that the armature windings 9 and 11 are stationary and that the field of the motor is rotating so that the field winding 17 of the motor must be energized through a pair of slip rings. In the embodiment illustrated in Fig. 1, the field current is obtained from a suitable source of current such as a battery 18, and may be regulated by means of a rheostat 19.

The control electrodes of the rectifier may be energized at a negative potential with respect to the potential of cathode 16 from a battery 21 through banks of resistances 22 and 23. Such control electrodes may also be energized from line 6 through a switch 24 and through a transformer having a primary winding 26 and a secondary winding 27 having a mid-point thereof connected with cathode 16. Such energization is controlled by means of rotating switches 28 and 29 operating at the frequency of the supply line voltage and through distributors 31 and 32 having the brushes thereof driven from the shaft of the motor. The position of the segments of distributors 31 and 32 may be adjusted by means of a lever 33 whereby the sequence of energization of the portions of armature windings 9 and 11 may be selected with respect to the position of motor field. Switches 28 and 29 are driven by a synchronous motor 34 herein illustrated as consisting of a split phase armature 36 energized from line 6 and of a field 37 divided into a plurality of spatially displaced sections and energized from a battery 38 over a rheostat 39. A lever 41 controls the position of the brushes of rheostat 39 to permit adjustment of current distribution within the several portions of field 37 and thereby to control the position of the magnetic axis of motor 34. The control electrodes may also be energized from line 6 over the above described distributor and through resistances 42 and 43 and inductances 44 and 46, in addition to through transformer 26, 27, whereby the alternating potentials supplied to the control electrodes may be displaced by substantially 90° from the potentials of line 6.

In operation, assuming the system to be connected as shown in the drawing, line 6 energizes primary winding 7 of the transformer so that winding 8 energizes windings 9 and 11 at alternating voltages which are equal in magnitude and displaced by 180° with respect to each other. The action of reactor 10 will first be disregarded, so that voltage applied to winding 9 may be represented by sinusoidal curve 47 in Fig. 2; line 48 represents the back E. M. F. of the armature which may be assumed to be constant. The control voltage applied to the brush of switch 28 from winding 27 may then be represented by another sinusoidal curve 49 in phase with curve 47. The voltage impressed upon winding 11 and upon the brush of distributor 29 may then be represented by curves identical with curves 47 and 49 respectively, but displaced therefrom by 180 degrees. Assuming that the system is considered in operation at the instant represented by point A of the time abscissa in Fig. 2, winding 9 and switch 28 simultaneously receive positive potentials with respect to cathode 16. All the control electrodes with the exception of electrode 14a are then negatively energized with respect to cathode 16 from battery 21 through resistances 22 and 23. At such time, control electrode 14a receives a sinusoidal positive potential from line 6 over switch 24, transformers 26, 27, switch 28, segment 31a of distributor 31 and resistance 22. The anode 12a associated with control electrode 14a, is thus permitted to carry current and current flows from winding 8 over winding portion 9a, anode 12a, and cathode 16 to the middle point of winding 8. Such flow of current continues for a period not exceeding one-half of a cycle of the alternating voltage of line 6 and tends to at a time represented by point B in Fig. 2, at which time the voltage impressed on winding 9 becomes less than the back E. M. F. thereof, but continues for a further period of time due to the action of the inductance of the transformer and of the motor windings.

During the next half cycle of the voltage of line 6, winding 9 and the brush of switch 28 are energized at negative potentials with respect to cathode 16 and no longer figures in the operation of the motor. At such time, positive potentials are applied to winding 11 and to the brush of switch 29. All the control electrodes of rectifier 13 are then maintained at a negative potential with respect to the cathode from battery 21 with the exception of control electrode 14b which is energized at the positive potential from line 6 over switch 24, transformer 26, 27, switch 29, segment 32a of distributor 32 and resistance 22. Winding 11a then carries current in a manner similar to that described for winding portion 9a, the flow of current in the two winding portions also being of equal duration. Winding portions 9a and 11a thus alternately carry current during each cycle of the voltage of line 6, such flow of current continuing as long as the brushes of distributors 31 and 32 are in contact with segments 31a and 32a thereof respectively. Such flow of current may therefore extend over a period of time which comprises a variable number of cycles of the voltage of line 6.

Flow of current in windings 9 and 11 and in field winding 17 produces a torque which causes rotation of the motor field. Such rotation also causes the brushes of distributors 31 and 32 to leave segments 31a and 32a respectively and to come into contact with another pair of segments. Control electrodes 14a and 14b are then no longer capable of being energized from line 6 through switches 28 and 29 and the flow of current in winding portions 9a and 11a is then prevented. Another pair of control electrodes of the rectifier may then be energized instead, thereby permitting operation of a pair of anodes associated therewith to control the flow of current in another portion of winding 9 and another portion of winding 11 in a manner similar to that described for winding portions 9a and 11a. Such operation again impresses a torque on the motor and causes further rotation of the field thereof.

The above process is repeated sequentially for each portion of windings 9 and 11 during each revolution of the field of the motor to impart to the field a substantially uniform torque in a continuous direction. Depending on the speed of the motor, each winding portion receives current during a variable number of successive cycles of the supply line voltage during each revolution. The operation of the motor may be regulated by any means known in the art for the control of electric current rectifiers. In particular, the application of positive potentials to the control electrodes of the rectifier may be advanced or retarded with respect to the spatial position of the field by adjusting the position of the segments of distributors 31 and 32 by means of lever 33. The particular armature winding portions receiving current at any particular time may thus be selected with respect to the position of the field, thereby adjusting the magnitude of the torque caused by the interaction of the armature and of the field. If lever 33 is moved in a direction opposite to the direction of rotation of the motor, the torque will gradually decrease in value and reach the value zero when the distributor segments have moved by an angle of 90 electrical degrees. Further shifting of the distributor will cause the currents in the motor to produce a torque opposite to the torque previously obtained, thereby permitting reversal of direction of rotation of the motor without the use of switching devices and without necessitating the expenditure of electrical energy. It will be understood that lever 33 may also be adjusted automatically in response to the variations of mechanical or electrical quantities or in accordance with a predetermined time schedule controlled by mechanical or by electrical means.

The intensity of the current in the armature may be directly regulated by means of switches 28 and 29. By adjusting lever 41, the magnetic axis of motor 34 may be displaced so that the voltage represented by curve 49 in Fig. 2 may be impressed on either one of the control electrodes such as 14a at a time represented by any point between points C and D of Fig. 2. The flow of current in one of the armature windings, once so initiated, continues until the applied voltage of the motor becomes smaller than the back E. M. F. thereof. It thus appears that the length of time during which current flows in the armature during each cycle of the supply voltage is dependent not only on the energization of the control electrodes, but also on the value of the back E. M. F. of the motor and may therefore also be regulated by adjustment of such back E. M. F. which may be varied by means of rheostat 19 in the circuit of the field winding.

When the motor is to return energy to the supply line to produce regenerative braking, lever 41 is first shifted in such a way that the current taken by the motor is gradually decreased to zero. To obtain such effect the point at which a control electrode such as 14a is positively energized from switch 28 is shifted until such energization occurs at point D in Fig. 2, at which point such energization no longer permits flow of any current through the anode associated with the control electrode. The point of energization of the control electrodes is further shifted to point E at which the impressed voltage of the motor becomes equal to the back E. M. F. thereof taken in inverse value for a purpose which will appear hereinafter. Lever 33 is then shifted by 180 electrical degrees so as to permit energization of only the control electrodes associated with anodes in which the flow of current would tend to reverse the rotation of the motor and would therefore produce a braking torque within such motor when the direction of rotation of the field is not changed. Switch 24 may then be reversed so as to impress, on the brushes of switches 28 and 29, voltages lagging by 90 degrees behind the voltages of line 6. The voltage impressed on the brush of switch 28 may then be represented by curve 52 lagging substantially 90 degrees behind curve 49.

The control electrodes controlling the flow of current in winding 9 will then be positively energized at point E, at which point the applied voltage is equal to the back E. M. F. of the motor. The associated anodes are thus made operable only at times when they are at the potential of the cathode and are becoming negative with respect to such cathode, so that the motor does not receive nor produce current. Lever 41 is then so adjusted as to shift the point of energization of the control electrodes from point E towards point D. A control electrode such as 14a then becomes positively energized and permits operation of the associated anode such as 12a at a moment when the impressed voltage is negative but less than the back E. M. F. of the motor, at which time the anode is therefore positively energized with respect to the cathode and may carry current. The flow of such current ceases only after point E at which the potential of the anode again becomes equal to the potential of the cathode, such flow being continued past point E due to the action of the inductance of the transformer and of the motor windings. The intensity of the current returned to the supply line may be controlled by adjustment of lever 41 so as to produce positive energization of the control electrodes at any desired point between points D and E. As is well known, an accidental energization of a control electrode between points F and C of Fig. 2 would cause the associated anode to operate until a time represented by point E in the following voltage cycle at which time the current would have become so large that it could no longer be extinguished before a time corresponding to point F in such cycle. The result thereof would be that such flow of current would continue from one cycle to another and could not be extinguished. Such faulty operation is precluded because, between points F and C, the control voltage represented by curve 52 is negative and an energization of a control electrode at such potential would be without result.

From a consideration of Fig. 2 it will appear that, during the two possible periods of operation of the motor represented by intervals AD and DF, the voltage applied to the armature of the motor is not equal to the back E. M. F. thereof. Such difference of voltages is absorbed within the windings of transformer 7, 8 which functions in this respect as a reactor. Due to the insertion of reactor 10 between cathode 16 and the mid tap of winding 8, such voltage difference appears at the terminals of the reactor instead of at the terminals of the transformer. The flow of rectified current through said motor by way of the transformer and rectifier is, therefore, substantially free of harmonic components. The transformer 7, 8 may therefore be constructed with a smaller value of reactance because such reactance is no longer needed for absorbing the difference between the applied voltage and the back E. M. F. in the armature windings.

In the embodiment illustrated in Fig. 3, reactor 10 is omitted and the armature and the field circuits of the motor are magnetically interlinked by means of a transformer 53. The remainder of the control members of the present embodiment are identical to the remaining control members of the embodiment illustrated in Fig. 1 and are, therefore, omitted in Fig. 3. As is well known the current flowing between cathode 16 and the mid tap of winding 8 consists of consecutive half waves similar in shape to the positive portion of curve 47 in Fig. 2. Due to the action of transformer 53, the flow of current from cathode 16 causes the superimposition of a voltage ripple on the voltage of battery 18 with the result that the voltages applied to the armature windings and the voltage applied to the field winding become equal or proportional at every instant. Due to the fact that the back E. M. F. of the motor is proportional to the voltage applied to the field winding thereof, the back E. M. F. of the motor and the voltage applied to the armature thereof will thus be substantially equal at every instant and transformer 7, 8 will not need to absorb any reactance drops in the armature circuit.

In the two embodiments described above, rectifier 13 was assumed to be of the metallic vapor arcing type in which the usual ignition and excitation members were assumed to be well known and are, therefore, not shown. In the embodiment illustrated in Fig. 4 the field winding of the motor is assumed to be supplied with the excitation current of the rectifier. The excitation circuit then comprises a transformer 54 having a primary winding energized from line 6 and a secondary winding provided with a mid-tap connected with rheostat 19. The secondary terminals of transformer 54 are connected with excitation anodes 56 and 57 of the rectifier and the circuit is completed by connecting cathode 16 with one of the slip rings of the motor field. The field current of the motor is thus obtained by means entirely similar to the means controlling the armature current so that the field current and the armature current will have similar wave shapes. The back E. M. F. of the motor will thus again be equal at all times to the applied voltage of the armature thereby relieving transformer 7, 8 of the function of a reactor. In Fig. 4, the control members illustrated in Fig. 1 and omitted in Fig. 3 were again omitted for the purpose of simplifying the drawing.

Although but a few embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a motor control system, an alternating current supply line, a motor having a plurality of armature windings and a field winding, a transformer connecting the armature windings with said supply line, an electron discharge device connected with the armature windings and controlling the flow of current therethrough, said device having anodes with associated control electrodes, means driven by the said motor to aid in controlling the energization of the control electrodes, and means operative in synchronism with the frequency of said line and connected with the first said means to cooperate in controlling the energization of the control electrodes to control operation of said device.

2. In a motor control system, an alternating current supply line, a motor having a plurality of armature windings and a field winding, a transformer connecting the armature windings with said supply line, an electron discharge device connected with the armature windings and controlling the flow of current therethrough, means operable responsive to rotation of said motor to aid in controlling the operation of said device, and means connected with said line and with the first said means to cooperate therewith in controlling the operation of said device in synchronism with the voltage cycle of said line.

3. In a motor control system, an alternating current supply line, a motor having a plurality of armature windings and a field winding, a transformer connecting the armature windings with said supply line, an electron discharge device connected with the armature windings and controlling the flow of current therethrough, means operable responsive to rotation of said motor to aid in controlling the operation of said device, means for varying the operation of the first said means, and means for applying an alternating current potential to the first said means to cooperate therewith in controlling the operation of said device.

4. In a motor control system, an alternating current supply line, a motor having a plurality of armature windings and a field winding, a transformer connecting the armature windings with said supply line, an electron discharge device connected with the armature windings and controlling the flow of current therethrough, means operable responsive to rotation of said motor to aid in controlling the operation of said device, means for varying the operation of the first said means, means for applying an alternating current potential to the first said means to cooperate therewith in controlling the operation of said device, and means for shifting the phase of the alternating current potential applied to the first said means, the second and the last said means cooperating to permit regenerative braking operation of said motor.

5. In a motor control system, an alternating current supply line, a motor having a plurality of armature windings and a field winding, a transformer connecting the armature windings with said supply line, an electron discharge device connected with the armature windings and controlling the flow of current therethrough, said device having anodes with associated control electrodes, distributors driven by the said motor to aid in controlling the energization of the control electrodes, and switches operated in synchronism with the voltage cycle of said line and connected with said distributors to cooperate therewith in controlling the energization of the control electrodes to control operation of said device.

6. In a motor control system, an alternating current supply line, a motor having a plurality of armature windings and a field winding, a transformer connecting the armature windings with said supply line, an electron discharge device connected with the armature windings and controlling the flow of current therethrough, said device having anodes with associated control electrodes and a cathode, a source of current connected with said control electrodes for applying potential thereto negative with respect to the cathode potential, distributors having brushes mounted for rotation with the shaft of said motor for sequentially connecting the control electrodes with said supply line, a synchronous motor, and switches included in the connections of said line with said distributors and arranged to be operated by said synchronous motor, said distributors and said switches cooperating to control the moments of connections of said line with the control electrodes to thereby vary the operation of said device.

7. In a motor control system, an alternating current supply line, a motor having a plurality of armature windings and a field winding, a transformer connecting the armature windings with said supply line, an electron discharge device connected with the armature windings and controlling the flow of current therethrough, said device having anodes with associated control electrodes and a cathode, a source of potential negative with respect to the cathode potential continuously connected with said control electrodes, distributors having brushes mounted for rotation with the shaft of said motor for sequentially connecting the control electrodes with said supply line, a synchronous motor, means connected with said synchronous motor to cause the position of the armature thereof to vary relative to the voltage cycle of said line, and switches included in the connections of said line with said distributors arranged to be operated by said synchronous motor, said distributors and said switches cooperating to control the moments of connection of said line with the control electrodes to thereby vary the operation of said device.

8. In a motor control system, an alternating current supply line, a motor having a plurality of armature windings and a field winding, a transformer connecting the armature windings with said supply line, an electron discharge device connected with the armature windings and controlling the flow of current therethrough, means operable responsive to rotation of said motor to aid in controlling the operation of said device, means connected with the first said means to cooperate therewith in controlling the operation of said device, and means connected with said transformer for giving the potential impressed on said motor and the back electromotive force thereof substantially the same wave shape.

9. In a motor control system, an alternating current supply line, a motor having a plurality of armature windings and a field winding, a transformer connecting the armature windings with said supply line, an electron discharge device connected with the armature windings and controlling the flow of current therethrough, means operable responsive to rotation of said motor to aid in controlling the operation of said device, means connected with the first said means to cooperate therewith in controlling the operation of said device, and means connected with said transformer and with the field winding of said motor to reduce the flow of harmonic current components through said motor.

10. In a motor control system, an alternating current supply line, a motor having a plurality of armature windings and a field winding, a transformer connecting the armature windings with said supply line, an electron discharge device connected with the armature windings and controlling the flow of current therethrough, means operable responsive to rotation of said motor to aid in controlling the operation of said device, means connected with the first said means to cooperate therewith in controlling the operation of said device, and a transformer connecting the field winding of said motor with said device for giving the potential impressed on said motor and the back electromotive force thereof substantially the same wave shape and to improve the power factor of the system.

11. In a control system for an electric motor having a plurality of armature windings each divided into a plurality of angularly displaced sections connected to form a star-point connection, a source of alternating current, a transformer connected with said source comprising a winding connected to form a mid-point connection dividing such winding into sections severally connected with the star-point connections of said armature windings to supply operating current thereto, an electron discharge device comprising a cathode connected with the mid-point of said transformer winding, a plurality of anodes severally connected with the sections of said armature windings, and a plurality of control electrodes severally associated with said anodes, and means having connections with said control electrodes and with said source operable to apply potential supplied from the latter to said control electrodes of such sign and magnitude and during such recurring periods as to control the initiation of flow of current from said source sequentially through the respective sections of said armature windings by way of said anodes and cathode.

12. In a control system for an electric motor having a plurality of armature windings each divided into a plurality of angularly displaced sections connected to form a star-point connection, a source of alternating current, a transformer connected with said line comprising a winding connected to form a mid-point connection dividing such winding into sections severally connected with the star-point connections of said armature windings to supply operating current thereto, an electron discharge device comprising a cathode connected with said mid-point connection of said transformer winding, a plurality of anodes severally connected with the sections of said armature windings, and a plurality of control electrodes severally associated with said anodes, means having connections with said line and with said control electrodes operable to apply potential to the latter of such sign and magnitude and during such recurring periods as to control the initiation of flow of current sequentially through the respective sections of said armature windings, and means for varying the moments of application of said potential to said control electrodes relative to the voltage cycle of said line.

13. In a control system for an electric motor having a plurality of armature windings each divided into a plurality of angularly displaced sections connected to form a star-point connection, a source of alternating current, a transformer connected with said line comprising a winding connected to form a mid-point connection dividing such winding into sections severally connected with the star-point connections of said armature windings to supply operating current thereto, an electron discharge device comprising a cathode connected with said mid-point connection of said transformer winding, a plurality of anodes severally connected with the sections of said armature windings, and a plurality of control electrodes severally associated with said anodes, distributor switch means connectable with said line and having connections with said control electrodes for applying potential to the latter of such sign and magnitude and during such recurring periods as to control the flow of current from said line sequentially through the sections of said armature windings by way of said anodes and cathode, other distributor switch means controlling the connection of said line with the first said switch means, and means for affecting the operation of the second said distributor switch means to vary the moments of application of said potential to said control electrodes by way of the first said distributor switch means relative to the voltage cycle of said line.

ERWIN KERN.